May 6, 1941.　　　　W. E. KOCK　　　　2,240,788
ELECTRIC OSCILLATION GENERATOR
Filed March 17, 1938
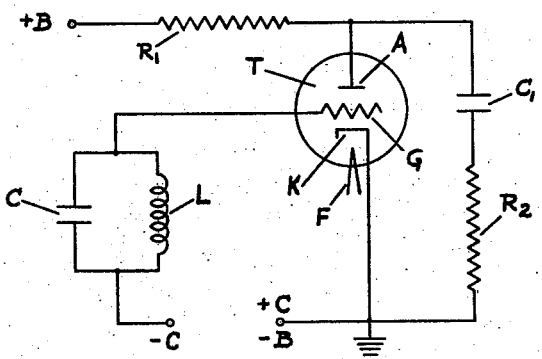
Fig. 1
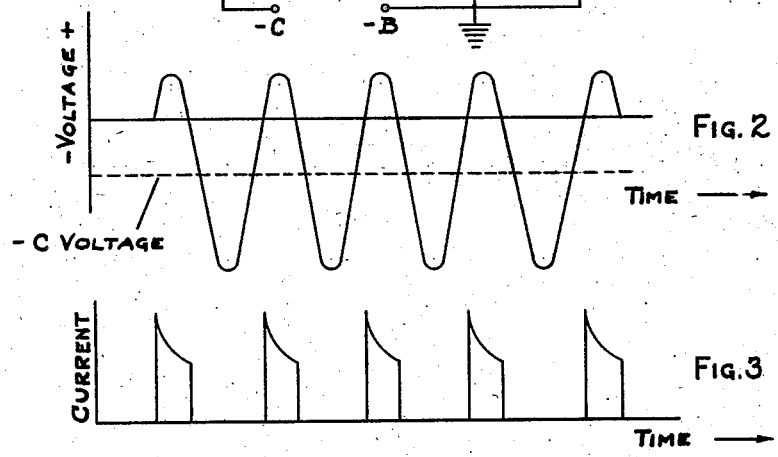
Fig. 2
Fig. 3
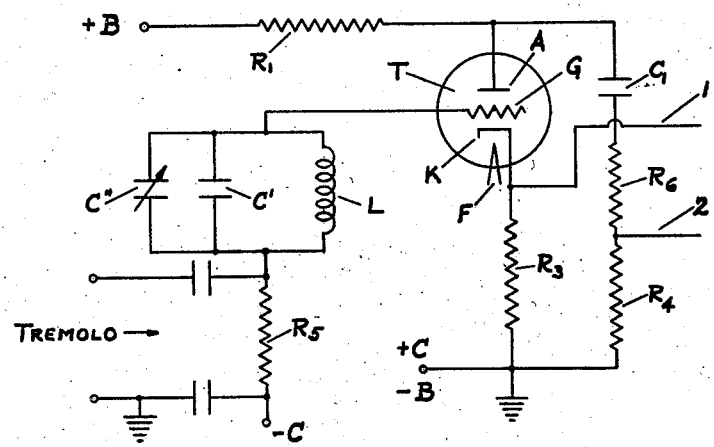
Fig. 4
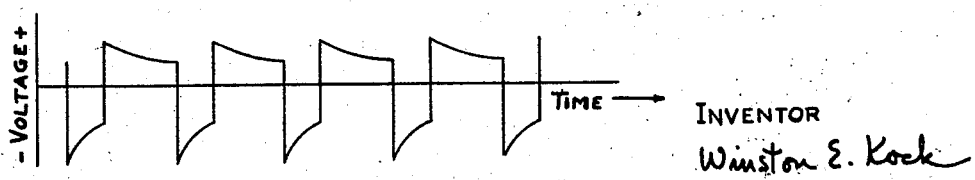
Fig. 5
INVENTOR
Winston E. Kock Patented May 6, 1941

2,240,788

UNITED STATES PATENT OFFICE 2,240,788

ELECTRIC OSCILLATION GENERATOR

Winston E. Kock, Cincinnati, Ohio, assignor to The Baldwin Company, Cincinnati, Ohio Application March 17, 1938, Serial No. 196,485

2 Claims. (Cl. 84—1.25)

My invention relates to the type of electric oscillation generator known as a glow-discharge oscillator, in which a tube containing electrodes and a gas is employed, the intermittent ionization of which characterizes the oscillations produced.

A primary object of the invention is to provide an electrical oscillator of the type defined, which is highly stable in frequency.

Another important object is to provide a generator from which electric oscillations of complex character may be readily derived. By a generator of oscillations of complex character I mean one producing oscillations in which a component having a fundamental frequency is to be found in combination with a large number of other components, of substantial strengths and related harmonically to the fundamental component.

It is another important object to provide an oscillator from which electric pulses may be conveniently derived for purposes of controlling the frequencies of other electrical oscillators.

The manner in which these objects are attained, and the attainment of other objects which will be apparent to those skilled in the art on reading this description, will now be shown specifically. For clearness in this, reference will be made to the accompanying drawing forming a part hereof, wherein:

Figure 1 is a wiring diagram of a glow-discharge oscillator incorporating the fundamental features of the invention;

Figure 2 is the wave form of the voltage caused by oscillations in a resonant couple;

Figure 3 is the form of discharges occurring in the tube of the oscillator of Figure 1;

Figure 4 is a wiring diagram indicative of the ways in which electric pulses and oscillations may be derived from an oscillator of the invention, together with means for providing frequency modulation; and Figure 5 is the wave form of an output voltage from the oscillator.

I have found, in the course of my experiments in this art, that if a third electrode be placed between the discharge electrodes in a glow-discharge tube, this third electrode, as a result of its immersion in the discharge plasma, is electrically affected by the ionization in the tube. If for example the third electrode is biased negatively, it captures some of the positive charges from the ionic flow in the tube, and if the electrode be placed in a circuit related to the tube a current flows in this circuit as a result.

Briefly in a practice of my invention I employ a glow-discharge oscillator in which an electrode, preferably in the form of a grid, is placed between the discharge electrodes of the oscillator tube; and I form a grid circuit by connecting the grid to one of the discharge electrodes, preferably the cathode, through a parallel inductance-capacity couple, and in conjunction with a source of negative potential. As a result of the above described grid effect, each discharge in the tube in the operation of the oscillator causes a pulse of current to flow from grid to cathode through the external part of the grid circuit; and these pulses "shock" the inductance-capacity couple so as to set up oscillations within it at its natural frequency. Correspondingly, oscillatory voltages appear across the couple terminals. The positive parts of these voltages act to initiate discharges in the tube by lowering its ionizing potential, through the grid as a controlling electrode, while the negative parts of the voltages, by their opposite affect upon the grid, act to prevent discharges in between those caused by the positive parts. The periodicity of the tube discharges and hence the oscillator frequency is thus determined as that of the inductance-capacity couple. In this way I have found it possible to establish a greater stability of frequency in a glow-discharge oscillator than has hitherto been accomplished, at least to the best of my knowledge.

I have shown in Figure 1 a glow-discharge oscillator incorporating the fundamental features of the invention. This oscillator includes a discharge tube T comprising an envelope containing an ionizable gas, in which are immersed an anode A, a cathode K and a grid G, between these two electrodes. Connected to the anode through a resistance $R_1$ is a source of positive potential $+B$, and connected from the anode to the cathode is a condenser $C_1$. The grid circuit of the oscillator comprises in order, the grid G, a resonant couple consisting of an inductance L and a capacity C in parallel, a source of negative potential $-C$, and the cathode K. The cathode may be conveniently connected to ground as indicated, and the sources $+B$ and $-C$ may be referred to ground, as shown by a grounded terminal marked $-B$, $+C$. I have found it advantageous to employ a heated thermionic cathode in the discharge tube, as by its use a discharge in the tube may be initiated by a considerably smaller voltage change on the grid than would be required with a cold cathode. For heating the cathode K a filament F is employed, and with a heated cathode the use of a negative bias $-C$ on the grid is advisable.

For purposes of comparison, I shall first describe the operation of the oscillator of Figure 1 in the absence of the resonant couple L—C, i. e., with the external part of the grid circuit including only the source $-C$. In this event, the oscillator becomes a conventional relaxation type of glow-discharge oscillator. The condenser $C_1$ charges relatively slowly from the positive potential source +B until the ignition potential of the tube (somewhat lower than that of the source +B) is reached. The tube T then ignites (i. e., the gas therein suddenly ionizes), a discharge current flows from anode to cathode, discharging the condenser $C_1$ relatively rapidly until the extinction potential of the tube is reached. The tube then extinguishes, the condenser recharges again, and oscillations of the relaxation type are thus produced, the oscillator being operable over a wide frequency range. The frequency of the conventional relaxation type glow-discharge oscillator is determined by the value of the source +B, the tube potentials and the circuit parameters $R_1$ and $C_1$; ordinarily however it does not have adequate frequency stability, as is well known, owing to variations in the values of these items, particularly variations in tube potentials and in a source +B, if derived say from a commercial power supply.

However by employing a parallel resonant couple L—C, in the grid circuit as shown, I have effected excellent stability in a glow-discharge oscillator. As was aforedescribed each discharge in the tube T places an electrical charge on the grid G and the resulting current flowing in the grid circuit "shocks" the couple L—C to set up in it oscillations of substantially sinusoidal wave form at the natural frequency of the couple. These, as represented by the voltages developed across the couple terminals, are shown in Figure 2 and act as a frequency control upon the oscillator. I have represented these sinusoidal voltages in Figure 2 as "biased" down on a dotted line, —C voltage. This is to indicate the negative bias —C applied to the grid, on which the oscillatory voltages are superimposed. Figure 3 indicates the current pulses of the discharges in the tube T, which are effective in producing oscillations in the couple L—C.

It is to be understood that the pulses of Figure 3 and the voltages of Figure 2 interact in controlling the frequency of the oscillator. For, each positive part of the resonant couple voltages, pulses the grid G positively to effect an oscillator discharge, and each discharge in turn furnishes energy to the couple. The negative parts of the couple voltages act to prevent discharges in between those desired. Now it is readily possible to secure a couple with a low degree of damping, by employing a low-loss capacity C, and an inductance L with a high reactance-to-resistance ratio (high Q); and thus in the steady state condition under which the oscillator operates generous energy may be built up in the couple—the damping upon the couple by the remainder of the grid circuit is negligible, as the grid-to-cathode impedance is very high. With low damping in the couple and with large controlling voltage available thereby, the frequency of discharges in the oscillator and thus the oscillator frequency becomes that of the resonant couple, namely, $$f = \frac{1}{2\pi\sqrt{LC}}$$

this frequency being maintained over large variations in +B and tube characteristics.

I have illustrated a resistance $R_2$ in series with the condenser $C_1$ in Figure 1. I find the use of this resistance has a two-fold advantage. It prevents excessive discharge currents through the tube T by extending a discharge, and through this a more effective type of pulse is delivered to the resonant couple L—C. The form of pulses shown in Figure 3 are those secured with the resistance $R_2$ incorporated in the oscillator.

The following values may be employed for the parts described, in an exemplary combination:

The gas argon is employed in the tube T at a pressure of 0.25 mm. mercury absolute B = 195 volts
—C = 15 volts
$R_1$ = 1,000,000 ohms
$C_1$ = .001 mfd.
$R_2$ = 50,000 ohms
L and C = 4 henries and .001445 mfd. respectively for an oscillator frequency of 2093 cycles per second (c. p. s.)

In summation therefore, a glow-discharge oscillator employing a control grid in the discharge tube is secured having a high degree of frequency stability, by employing in the device relaxation parts so placed and of such values that the device oscillates per se as a relaxation glow-discharge oscillator at a frequency approximately that at which stabilization is desired, and by adding in the grid circuit of the oscillator means resonant at the frequency desired and of sufficiently low damping so as to operate as above explained to stabilize the device at the desired frequency.

In a copending United States patent application Serial No. 196,484, filed March 17, 1938, now Patent No. 2,233,948 issued March 4, 1941, another invention of mine has been disclosed in an exemplary embodiment of an organ-like electrical musical instrument. In it, electrical relaxation oscillators are employed as sources of electric oscillations of complex character for tone production. The oscillators are arranged in groups, each group corresponding to a note and its octaves in a multioctave musical scale and comprising an improved cascade frequency system including a stable source of oscillations and a series of relaxation oscillators, related in frequencies by successive exact octaves and operating exactly in phase.

Oscillators constructed according to the present invention may be employed advantageously in that of the copending application No. 196,484, as the stable sources of oscillations in its cascade frequency systems, and may thus comprise its twelve master oscillators corresponding to a high octave register of a musical instrument, from which the lower octave oscillators are controlled respectively in cascades.

Figure 4 of the accompanying drawing may represent this use of a present oscillator. A resistance $R_3$ is illustrated in Figure 4 in the connection from the cathode K to ground. With each discharge of the tube T a pulsatory current (Figure 3) is sent down this resistance $R_3$, the end remote from ground of the resistance acquiring a positive potential with each pulse. Pulses of this nature are useful for frequency controlling purposes, as has been described in the aforementioned application No. 196,484. Thus if the oscillator of the present invention has a frequency of 2093 c. p. s., as aforesaid, which corresponds to a high C note in the equitempered musical scale based upon an A note = 440 c. p. s., it may control the frequency of an oscillator for the C note an octave below, to an exact octave below it, namely 1046.5 c. p. s., via the pulses derived across the resistance $R_3$. The two oscillators then form the stable source of oscillations and the first controlled oscillator of a cascade frequency system in which oscillations are at exact octaves and in phase, as explained in the application No. 196,484.

The lead 1 attached to the end remote from ground of $R_3$ may transfer controlling pulses from the present oscillator.

Oscillators of the present invention may also be used as sources of complex oscillations for musical tones and may thus be applied in the organization represented by the application No. 196,484. Means for this purpose are illustrated in Figure 4, comprising the tone productive resistance $R_4$ in the oscillator discharge circuit, with one of its ends at ground, and a lead 2 attached to the other end of this resistance. The lead 2 may be connected, through playing key switches, to various circuits and devices, according to the organization in the application No. 196,484, and tone productive oscillations thus derived are satisfactory for the purpose. Their wave form is shown in Figure 5, wherein the downwardly projecting peaks correspond to discharges of the condenser $C_1$ through the tube T (see also Figure 3), while the upper parts of the wave forms correspond to chargings of this condenser.

To tune a present oscillator, the condenser C of Figure 1 may be replaced by a fixed condenser C' and a smaller variable condenser C'' in parallel, as shown in Figure 4. A frequency tremolo may also be applied to the oscillator across a resistance $R_5$ placed in the grid circuit, Figure 4. The tremolo voltage applied may be about 10 volts, for the exemplary combination of values of parts described, at a subaudio-frequency of about 6 to 7 c. p. s. This causes a frequency modulation of the oscillator over a range of about one-half a semitone, providing a pleasing pitch tremolo in musical tones produced therefrom, which tremolo I find musically preferable to an amplitude tremolo. In employing a frequency tremolo I find it desirable that the reactance-to-resistance ratio (Q) of the inductance L be not more than about twenty ohms-to-ohms. With a higher Q than this, frequency modulation of the oscillator is difficult. However it is readily within the spirit and scope of the invention to include inductances of higher Q's. Thus by employing a Q of seventy, I have secured an oscillator of extremely rigid frequency stability.

The following values for parts just described may be used in combination with the other values already given:

$R_3$ = 4,000 ohms
$R_4$ = 5,000 ohms
$R_5$ = 15,000 ohms

A resistance $R_6$ is indicated in Figure 4, in series with $R_3$ and $R_4$. This to complete the desired amount of resistance in the discharge circuit, whereby $R_3+R_4+R_6=R_2$ of Figure 1. With the values already given $R_6$ becomes 41,000 ohms.

Thus oscillators of this invention may be used exemplarily in the production of music according to the application No. 196,484; and the various values given in this description may be used in exemplary combinations with the values for parts given in that application. The present tone productive resistance $R_4$=5,000 ohms may be used, for instance, in parallel combination with tone productive resistances of 10,000 ohms for the relaxation oscillators given in the application No. 196,484.

The values for parts described above may be varied without departure from the teachings of the present invention, and other uses for oscillators constructed according to it are readily possible, not only in the electrical production of music but in other arts. Accordingly the scope of the invention is pointed out in the appended claims; and having thus described my invention, I claim the following:

1. A glow-discharge oscillator arrangement comprising a gas-filled tube having an anode, a cathode and a grid, an anode-to-cathode feed circuit including a resistance and a source of positive potential, and an anode-to-cathode discharge circuit including a capacity, whereby oscillations occur at an audio frequency approximately that at which it is desired to stabilize said oscillator, a grid-to-cathode circuit including a tuned electrical couple resonant at the stabilized frequency desired, said couple having a damping value, sufficiently low to be affected by discharges occurring in said tube as to reflect into said oscillator impulses of sufficient strength at said desired frequency to stabilize said oscillator thereat, but sufficiently high to permit the frequency of said oscillator to be varied about said desired frequency by an amount suitable for musical tremolo purposes upon application of sufficient voltage in said grid-to-cathode circuit, and a source of sub-audio frequency voltage located in said grid-to-cathode circuit, of a frequency expedient for said tremolo purposes and of said sufficient voltage.

2. Apparatus as set forth in claim 1, wherein said tuned electrical couple comprises inductance and capacity in parallel, and said sub-audio source is located between said couple and said cathode.

WINSTON E. KOCK.